(12) United States Patent
Hanna et al.

(10) Patent No.: US 11,845,901 B1
(45) Date of Patent: Dec. 19, 2023

(54) CONVERSION OF AN AEROSOLIZED HYDROCARBON STREAM TO LOWER BOILING POINT HYDROCARBONS

(71) Applicant: Saudi Arabian Oil Company, Dhahran (SA)

(72) Inventors: Brian Hanna, West Roxbury, MA (US); Michele Louisa Ostraat, Somerville, MA (US); Sergio Fernandez, Somerville, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/861,524

(22) Filed: Jul. 11, 2022

(51) Int. Cl.
*C10G 11/10* (2006.01)
*B01D 45/08* (2006.01)
(Continued)

(52) U.S. Cl.
CPC .............. *C10G 11/10* (2013.01); *B01D 8/00* (2013.01); *B01D 39/2017* (2013.01); *B01D 45/08* (2013.01); *B01D 46/003* (2013.01); *B01D 50/20* (2022.01); *B01J 19/24* (2013.01); *B01D 2239/04* (2013.01); *C10G 2300/206* (2013.01);
(Continued)

(58) Field of Classification Search
CPC .............. C10G 11/18; C10G 2300/202; C10G 2300/205; C10G 2300/301; C10G 2300/308; C10G 2300/4018; C10G 2400/04; C10G 2400/20; C10G 2400/30; C10G 11/182; C10G 11/187; C10G 51/02; B01J 8/004; B01J 8/0055; B01J 8/1809; B01J 8/1872; B01J 8/1881; B01J 8/24; B01J 2208/00008; B01J 2208/00539; B01J 2208/00548; B01J 2208/00584;
(Continued)

(56) References Cited

U.S. PATENT DOCUMENTS 3,617,493 A    11/1971   Wirth et al.
4,051,013 A *  9/1977   Strother .............. B01J 8/26
                                              208/159
(Continued)

OTHER PUBLICATIONS

Chen et al., "Renewable hydrogen production from bio-oil in an aerosol pyrolysis system" Procedia Engineering, vol. 102, pp. 1867-1876, 2015.
(Continued)

*Primary Examiner* — Randy Boyer
*Assistant Examiner* — Juan C Valencia
(74) *Attorney, Agent, or Firm* — DINSMORE & SHOHL LLP (57) ABSTRACT

A method of converting a liquid hydrocarbon stream to lower boiling point hydrocarbons may include converting the liquid hydrocarbon stream to an aerosolized hydrocarbon particle stream, and subjecting the aerosolized hydrocarbon particle stream to reaction conditions. Reaction conditions may include a temperature from 25° C. to 1,000° C. and a pressure from 1 bar to 15 bar. The method may further include forming the lower boiling point hydrocarbons in the aerosolized hydrocarbon particle stream and separating the lower boiling point hydrocarbons from the aerosolized hydrocarbon particle stream. The lower boiling point hydrocarbons may comprise at least $C_2$–$C_4$ olefins.

20 Claims, 4 Drawing Sheets

(51) Int. Cl.
  *B01D 46/00* (2022.01)
  *B01D 50/20* (2022.01)
  *B01D 8/00* (2006.01)
  *B01D 39/20* (2006.01)
  *B01J 19/24* (2006.01)

(52) U.S. Cl.
  CPC . *C10G 2300/301* (2013.01); *C10G 2300/308* (2013.01); *C10G 2300/4006* (2013.01); *C10G 2300/4012* (2013.01); *C10G 2300/70* (2013.01); *C10G 2400/20* (2013.01); *C10G 2400/22* (2013.01); *C10G 2400/30* (2013.01)

(58) Field of Classification Search
  CPC .... B01J 2208/00628; B01J 8/26; B01J 21/16; B01J 29/70
  See application file for complete search history.

(56) References Cited

U.S. PATENT DOCUMENTS

| | | | |
|---|---|---|---|
| 4,592,849 A | 6/1986 | McMillen | |
| 4,853,119 A | 8/1989 | Wolf et al. | |
| 4,871,709 A | 10/1989 | Tatsushima et al. | |
| 4,985,136 A * | 1/1991 | Bartholic | B01J 8/085 422/139 |
| 5,296,131 A * | 3/1994 | Raterman | C10G 11/18 208/163 |
| 6,860,979 B2 | 3/2005 | Sams | |
| 8,535,632 B2 | 9/2013 | Chase et al. | |
| 10,144,003 B2 | 12/2018 | Ali et al. | |
| 2010/0294994 A1 | 11/2010 | Basini et al. | |

OTHER PUBLICATIONS

John Hopkins University, "Aerosolization of Crude Oil-Dispersant slicks due to Bubble Bursting", Laboratory for Experimental Fluid Dynamics, web.jhu.edu/fluid_dynamics/Current_Projects/Oil Spill Research/bubble_bursting.html, 5 pages, May 12, 2020.

Kirsch et al., "Field Charging of Fine Aerosol Particles by Unipolar Ions", Aerosol Science and Technology, vol. 12, pp. 465-470, 1990.

O'Brien et al., "Liquid-Liquid Phase Separation in Aerosol Partiles: Imaging at the Nanometer Scale", Environmental Science & Technology, vol. 49, pp. 4995-5002, 2015.

* cited by examiner

CONVERSION OF AN AEROSOLIZED HYDROCARBON STREAM TO LOWER BOILING POINT HYDROCARBONS

TECHNICAL FIELD

The present disclosure relates generally to chemical processing and, more specifically, to the production of lower boiling point hydrocarbons such as olefins from a liquid hydrocarbon stream that has been converted to an aerosolized hydrocarbon particle stream.

BACKGROUND

Hydrocarbon feeds, such as crude oils, can be converted to chemical products and intermediates such as olefins and aromatic compounds, which are basic intermediates for a large portion of the petrochemical industry. The worldwide increasing demand for light olefins ($C_2$—$C_4$ olefins) and aromatic compounds remains a major challenge for many integrated refineries. In particular, the production of some valuable light olefins such as ethylene, propylene, and butenes has attracted increased attention as pure olefin streams are considered the building blocks for many chemical processes such as polymer synthesis. Additionally, aromatic compounds such as benzene, toluene, and xylenes are valuable intermediates for synthesizing polymers and other organic compounds as well as for fuel additives.

BRIEF SUMMARY

In many refining operations, complex systems are required to convert a liquid hydrocarbon stream to lower boiling point hydrocarbons. However, aerosolizing the liquid hydrocarbon stream to convert the liquid hydrocarbon stream to an aerosolized hydrocarbon particle stream may allow greater flexibility in how the liquid hydrocarbon stream is processed, handled, and separated. It has been discovered that converting the liquid hydrocarbon stream to an aerosolized hydrocarbon particle stream may improve the conversion to lower boiling point hydrocarbons while simplifying the refining operation. In the presence of an aerosolized reaction catalyst, a cracking reaction may occur in the aerosolized hydrocarbon particle stream. Further, by varying reaction conditions, lower boiling point hydrocarbons such as light olefins may be separated from the aerosolized hydrocarbon particle stream. Separation of the lower boiling point hydrocarbons, which may be converted to a vapor phase, from the hydrocarbon particle stream may be simplified as compared to conventional refining operations. Further, undesired solid products may be effectively separated from lower boiling point hydrocarbons that are in the vapor phase. Accordingly, in one or more embodiments disclosed herein, aerosolizing a liquid hydrocarbon stream may provide an effective means for separating lower boiling point hydrocarbons such as light olefins from the liquid hydrocarbon stream.

According to one or more embodiments of the present disclosure, a method of converting a liquid hydrocarbon stream to lower boiling point hydrocarbons may include converting the liquid hydrocarbon stream to an aerosolized hydrocarbon particle stream and subjecting the aerosolized hydrocarbon particle stream to reaction conditions, thereby forming the lower boiling point hydrocarbons in the aerosolized hydrocarbon particle stream. Reaction conditions may include a temperature from 25° C. to 1,000° C. and a pressure from 1 bar to 15 bar. The method may further include separating the lower boiling point hydrocarbons from the aerosolized hydrocarbon particle stream. The lower boiling point hydrocarbons may include at least $C_2$—$C_4$ olefins.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system 
components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. An arrow may indicate that two or more components are in "fluid communication with one another (i.e., fluid passes between units). Additionally, it should be understood that in one or more embodiments, an arrow may represent that at least 75 weight percent (wt. %), at least 90 wt. %, at least 95 wt. %, at least 99 wt. %, at least 99.9 wt. %, or even 100 wt. % of the stream is transported between the system components. As such, in some embodiments, less than all of the stream signified by an arrow may be transported between the system components, such as if a slip stream is present.

As used in the present disclosure, an arrow may represent passing a stream or effluent from one unit directly to another unit. For example, an arrow may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. However, arrows, in some embodiments, may not necessarily disclose the direct passing of a stream from one component to another of a given system.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed, according to one or more embodiments described herein, toward systems and methods for the conversion of a liquid hydrocarbon stream to lower boiling point hydrocarbons, such as $C_2$—$C_4$ olefins. The conversion may take place by converting the liquid hydrocarbon stream to an aerosolized hydrocarbon particle stream, contacting the aerosolized hydrocarbon stream with an aerosolized reaction catalyst, and subjecting the aerosolized hydrocarbon particle stream to reaction conditions, thereby forming the lower boiling point hydrocarbons.

As used herein, the term "crude oil" is to be understood to mean a mixture of petroleum liquids, gases, or combinations of liquids and gases, including some impurities such as sulfur-containing compounds, nitrogen-containing compounds and metal compounds that have not undergone significant separation or reaction processes. Crude oils are distinguished from fractions of crude oil. As used herein, the crude oil may be a minimally treated crude oil to provide a hydrocarbon oil feedstock having total metals (Nickel+ Vanadium) content of less than 5 parts per million by weight (ppmw) and Conradson carbon residue of less than 5 wt. % Such minimally treated materials may be considered crude oils as described herein.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, fluidized bed reactors, ebullated bed reactors, moving bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include, in some embodiments, only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction"(sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as a "medium boiling point fraction."

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in this disclosure, a "catalyst" or a "reaction catalyst" refers to any substance that increases the rate of a specific chemical reaction. An "aerosolized reaction catalyst"may refer to a catalyst in the aerosol phase that promotes the rate of a specific chemical reaction when contacting an aerosolized hydrocarbon stream. Catalysts described in this disclosure may be utilized to promote various reactions, such as, but not limited to, cracking (including aromatic cracking), demetalization, desulfurization, and denitrogenation. As used herein, "cracking"generally refers to a chemical reaction where carbon-carbon bonds are broken. For example, a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Figure 1:
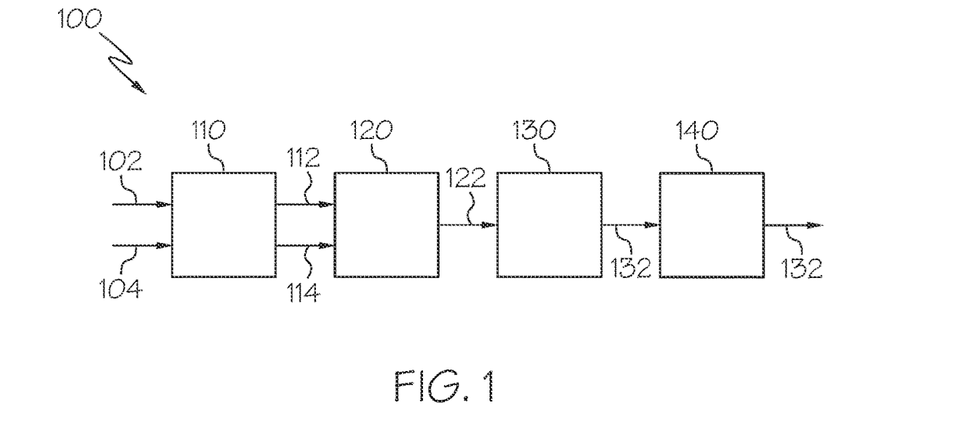
FIG. 1 schematically depicts a system for the conversion of a liquid hydrocarbon stream to lower boiling point hydrocarbons, according to one or more embodiments of the present disclosure.
Figure 2:
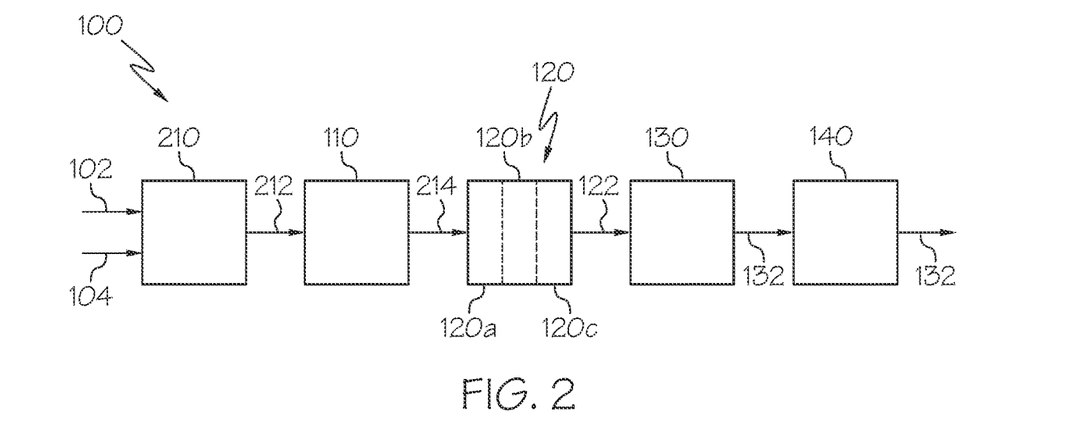
FIG. 2 schematically depicts another system for the conversion of a liquid hydrocarbon stream to lower boiling point hydrocarbons, according to one or more embodiments of the present disclosure.

Now referring to FIGS. 1 and 2, a method of converting a liquid hydrocarbon stream 102 to lower boiling point hydrocarbons 132 may include converting the liquid hydrocarbon stream 102 to an aerosolized hydrocarbon particle stream 112. The method may further include subjecting the aerosolized hydrocarbon particle stream 112 to reaction conditions, thereby forming lower boiling point hydrocarbons 132 and higher boiling point hydrocarbons in the aerosolized hydrocarbon particle stream 112, where reaction conditions comprise a temperature from 25° C. to 1,000° C. and a pressure from 1 bar to 15 bar, and separating the lower boiling point hydrocarbons 132 from the aerosolized hydrocarbon particle stream 112, where the lower boiling point hydrocarbons 132 include at least $C_2$—$C_4$ olefins. The method may further include contacting the aerosolized hydrocarbon particle stream 112 with an aerosolized reaction catalyst 114.

Still referring to FIGS. 1 and 2, systems 100 of the present disclosure for converting the liquid hydrocarbon stream 102 to the lower boiling point hydrocarbons 132 are schematically depicted. The systems 100 may include an aerosolizing unit 110, a hydrocarbon conversion unit 120, and a separation unit 130. The liquid hydrocarbon stream 102 and the reaction catalyst 104 may be separately fed to the aerosolizing unit 110. The aerosolizing unit 110 may convert the liquid hydrocarbon stream 102 and the reaction catalyst 104 to the aerosolized state.

Referring to FIG. 1, the aerosolizing unit 110 may then pass the aerosolized hydrocarbon particle stream 112 to the hydrocarbon conversion unit 120. Similarly, the aerosolizing unit 110 may pass the aerosolized reaction catalyst 114 to the hydrocarbon conversion unit 120. The aerosolizing unit 110 may be upstream of the hydrocarbon conversion unit 120. The hydrocarbon conversion unit 120 may comprise a reactor. The hydrocarbon conversion unit 120 may convert the aerosolized hydrocarbon particle stream 112 to lower boiling point hydrocarbons 132. The hydrocarbon conversion unit 120 may downstream of the aerosolizing unit 110 and upstream of the separation unit 130. A reaction unit effluent 122 may be sent downstream to the separation unit 130. The separation unit 130 may separate the lower boiling point hydrocarbons 132 from the reaction unit effluent 122.

Referring to FIG. 2, the system 100 may further include a mixing unit 210 upstream of the aerosolizing unit 110. The mixing unit 210 may combine the liquid hydrocarbon stream 102 and the reaction catalyst 104 to create a liquid hydrocarbon stream and reaction catalyst slurry 212 prior to aerosolizing either the liquid hydrocarbon stream 102 or the reaction catalyst 104. The liquid hydrocarbon stream and reaction catalyst slurry 212 may be fed to the aerosolizing unit 110 and so on in the same manner as previously described with respect to FIG. 1. It is contemplated that some conversion of the liquid hydrocarbon stream 102 may occur in the mixing unit 210 or in the aerosolizing unit 110, but the majority of the conversion may occur at the hydrocarbon conversion unit 120.

In embodiments, it is contemplated that some upstream processing of the liquid hydrocarbon stream 102 may occur. For example, the liquid hydrocarbon stream 102 may be treated with a catalyst to reduce poisonous materials (i.e., materials that would be poisonous to the reaction catalyst 104) such as heteroatoms, sulfur, nitrogen, vanadium, iron, or other metals. One skilled in the art would appreciate the treatment of the liquid hydrocarbon stream 102 prior to passing the liquid hydrocarbon stream 102 to the systems 100 of the present disclosure. As previously discussed, heteroatoms may be present in the liquid hydrocarbon stream 102. These heteroatoms, such as but not limited to nitrogen, sulfur, molybdenum, nickel, vanadium, or combinations thereof, are known to poison or inhibit catalyst activation during the conversion of the liquid hydrocarbon stream 102, such that they are also commonly referred to as impurities. Therefore, it may be beneficial to separate the heteroatoms/impurities from the liquid hydrocarbon stream 102 to avoid the poisoning or inhibiting of the catalysts.

As shown in FIG. 2, it is contemplated that the system 100 may include hydrocarbon conversion unit 120 comprising a plurality of reaction zones 120A, 120B, 120C. While three reaction zones 120A, 120B, 120C are depicted, any number of reaction zones 120A, 120B, 120C are contemplated. The plurality of reaction zones 120A, 120B, 120C may allow reaction conditions to vary between different zones. In embodiments, it is contemplated that the plurality of reaction zones 120A, 120B, 120C may be separated into a plurality of hydrocarbon conversion units 120. It is also contemplated that there may be separation units between each of the separation zones 120A, 120B, 120C or plurality of hydrocarbon conversion units 120.

Again referring to FIGS. 1 and 2, the liquid hydrocarbon stream 102 may include one or more heavy oils, such as, but not limited to, whole crude, crude oil, deasphalted crude oil, vacuum residue, tar sands, bitumen, atmospheric residue, vacuum gas oils (VGO), other heavy oil streams, de-metalized oil (DMO), de-asphalted oil (DAO), or combinations of these. It should be understood that, as used in this disclosure, a "heavy oil" may refer to a raw hydrocarbon, such as crude oil (e.g., Arab Light), which has not been previously processed through distillation, or may refer to a hydrocarbon which has undergone some degree of processing prior to being introduced to the system 100 as the liquid hydrocarbon stream 102.

When the liquid hydrocarbon stream 102 includes a crude oil, the crude oil may be a whole crude or may be a crude oil that has undergone at some processing, such as desalting, solids separation, scrubbing. For example, the liquid hydrocarbon stream 102 may be a de-salted crude oil that has been subjected to a de-salting process. The liquid hydrocarbon stream 102 may include a crude oil that has not undergone pretreatment, separation (such as distillation), or other operation that changes the hydrocarbon composition of the crude oil prior to introducing the crude oil to the system 100.

In embodiments where the liquid hydrocarbon stream 102 includes a crude oil, the crude oil may include an American Petroleum Institute (API) gravity of from 25 degrees to 50 degrees. For example, the crude oil may include an API gravity of from 25 degrees to 30 degrees, from 25 degrees to 35 degrees, from 25 degrees to 40 degrees, from 25 degrees to 45 degrees, from degrees to 35 degrees, from 30 degrees to 40 degrees, from 30 degrees to 45 degrees, from 35 degrees to 40 degrees, from 35 degrees to 45 degrees, or from 40 degrees to 45 degrees.

Table 1 sets forth the properties of Arab Light crude oil to show the various boiling point ranges and compositions of one crude oil that may be used as a liquid hydrocarbon stream 102 in embodiments of the present disclosure.

TABLE 1

| Properties of Arab Light Crude Oil | |
|---|---|
| Property | Abqaiq AL |
| Density | 0.8537 |
| S (ppmw) | 1.97 |
| N (ppmw) | 820 |
| Ni (ppmw) | 3.7 |
| V (ppmw) | 12.4 |
| TAN (mgKOH/g) | 0.05 |
| Pour Point (° C.) | −36 |
| <70° C. (wt. %) | 7.03 |
| 70° C.-185° C. (wt. %) | 17.08 |
| 185° C.-265° C. (wt. %) | 13.64 |

TABLE 1-continued

| Properties of Arab Light Crude Oil | |
|---|---|
| Property | Abqaiq AL |
| 265° C.-345° C. (wt. %) | 13.96 |
| 345° C.-460° C. (wt. %) | 16.81 |
| 460° C.-565° C. (wt. %) | 12.54 |
| >565° C. (wt. %) | 18.94 |

In Table 1, the Total Acid Number (TAN (mgKOH/g)) refers to a measure of acid concentration present in the crude oil. TAN may be measured using American Society for Testing and Materials (ASTM) Method D664. The "pour point" refers to the temperature at which a liquid loses its flow characteristics. "Pour point" may be defined as the minimum temperature in which an oil has the ability to pour down from a beaker. Pour point may also be measured using ASTM D97 or ASTM D5853.

As previously mentioned, prior to converting the liquid hydrocarbon stream 102 to the lower boiling point hydrocarbons 132, the liquid hydrocarbon stream 102 may be converted to an aerosolized hydrocarbon particle stream 112. Aerosolizing the liquid hydrocarbon stream 102 may result in individual hydrocarbon droplets that, without intent to be bound to any particular theory, may be subjected to various reaction conditions (temperature, pressure, residence time, presence of reactive gases) which are not typically accessible using conventional hydrocarbon processing systems. As further described in the present disclosure, the aerosolized hydrocarbon particle stream 112 may be subjected to a temperature ranging from 25° C. to 1000° C., a pressure ranging from 0 bar to 15 bar, and residence times ranging from 0.5 seconds (s) to 10 minutes. Further, the aerosolized hydrocarbon particle stream 112 may be subjected the presence of reactive gases such as, for example, oxygen, hydrogen, nitrogen, hydrogen peroxide, or combinations of these.

Additionally, lower boiling point hydrocarbons 132 may be more easily separable from the aerosolized hydrocarbon particle stream 112 or the reaction unit effluent 122 as temperature can be controlled to separate lower boiling point hydrocarbons 132 from the individual hydrocarbon droplets of the aerosolized hydrocarbon particle stream 112, particularly the higher boiling point hydrocarbons.

The aerosolizing unit 110 may be operated in a variety of ways to convert the liquid hydrocarbon stream 102 to the aerosolized hydrocarbon particle stream 112. Those skilled in the art will appreciate that there are numerous alternatives to aerosolizing a liquid. A variety of aerosolizing units 110 are envisioned, so long as they generate a liquid spray of droplets. Examples of aerosolizing units 110 may include, but are not limited to, spray nozzles, spray nebulizers, spray dryers, airbrushes, ultrasonic atomizers, other aerosolizing devices, or combinations of these. In some embodiments, an ultrasonic transducer may be used to generate the aerosolized hydrocarbon particle stream 112. It is contemplated that ultrasonic transducers may be readily scalable and highly controllable. In other embodiments, a two-step approach may be used to convert the liquid hydrocarbon stream 102 to the aerosolized hydrocarbon particle stream 112. In such an approach, the first step may include boiling the liquid hydrocarbon stream 102 to produce a vapor. The second step may include condensing the vapor to form liquid droplets (i.e., the aerosolized hydrocarbon particle stream 112).

In embodiments where the liquid hydrocarbon stream 102 is converted to the aerosolized hydrocarbon particle stream 112 using a spray nozzle or an airbrush, the liquid hydrocarbon stream 102 may be contacted with a compressed gas. The compressed gas may be responsible for providing the energy necessary to atomize the liquid hydrocarbon stream 102. The pressure from the compressed air may disintegrate the liquid hydrocarbon stream 102 into fine droplets due to the shear forces exerted by the compressed gas on the liquid surface. The compressed gas may be, for example, air, oxygen, or nitrogen.

In one non-limiting example, and in embodiments, the compressed gas may be emitted through an outlet of a spray nozzle, thereby contacting the liquid hydrocarbon stream 102 with the compressed gas at the outlet of the spray nozzle. In another non-limiting example, the compressed gas may contact the liquid hydrocarbon stream 102 before exiting the spray nozzle. For example, the liquid hydrocarbon stream 102 and the compressed gas may be fed through two different inlet valves within the spray nozzle, thereby contacting each other. The liquid hydrocarbon stream and the compressed gas may thereby together be emitted through the outlet of the spray nozzle and atomized by the spray nozzle into the aerosolized hydrocarbon particle stream 112. In another non-limiting example, the compressed gas may be emitted through the previously discussed airbrush, thereby passing the compressed gas across a surface of the liquid hydrocarbon stream. Embodiments herein may also include combinations of the previous.

In embodiments including the spray nozzle, the liquid hydrocarbon stream 102 may first be fed through a Venturi nozzle then through a second nozzle, or other small orifice, downstream of the Venturi nozzle that mixes with high velocity compressed gas. In embodiments, the pressure drop through the nozzle may range from 0.1 bar to 2.5 bar. Gas flow rates may range from 200 liters per hour (L/h) to 3000 L/h. A larger pressure drop may lead to a higher gas flow rate.

In embodiments where the liquid hydrocarbon stream 102 is converted to the aerosolized hydrocarbon particle stream 112 using an ultrasonic atomizer, ultrasonic vibration may be introduced to the liquid hydrocarbon stream 102. High frequency vibrations, ranging from, for example, 10 kHz to 250 kHz, may be used to produce droplets of the liquid hydrocarbon stream 102. A piezoelectric crystal may cause capillary waves on a surface film of the liquid hydrocarbon stream 102 at a nozzle. The high frequency vibrations may be converted to mechanical energy that is transferred to the surface film of the liquid hydrocarbon stream 102. The mechanical energy transferred to the liquid hydrocarbon stream 102 may generate a fine mist of liquid droplets (i.e., the aerosolized hydrocarbon particle stream 112). The power necessary to generate the vibrations in the range of 10 kilohertz (kHz) to 250 kHz may range from 0.1 watts to 20 watts.

The type of aerosolizing unit 110 and the specifications of the aerosolizing unit 110 may influence the particle size of the aerosolized hydrocarbon particle stream 112 by influencing the average droplet size of aerosolized hydrocarbon particle stream 112. The type, specifications, or both of the aerosolizing unit 110 may also influence the particle size of the aerosolized hydrocarbon particle stream 112 by increasing the turbulence the liquid hydrocarbon stream 102 as it is being aerosolized, which may cause some droplets to collide and combine into larger droplets. In some embodiments, the aerosolizing unit 110 may be capable of producing droplets of the aerosolized hydrocarbon particle stream 112 having droplet sizes from 0.1 μm to 150 μm, from 0.1 μm to 20 μm, from 0.5 μm to 100 μm, or from 0.5 μm to 20 μm.

The aerosolizing unit 110 may also be operable to function as a settling tank. Larger droplets of the aerosolized hydrocarbon particle stream 112 may fall to the bottom of the aerosolizing unit 110, while smaller droplets of the aerosolized hydrocarbon particle stream 112 may be passed from the aerosolizing unit 110 to the hydrocarbon conversion unit 120. The larger droplets of the aerosolized hydrocarbon particle stream 112 may be heavier than the smaller droplets of the aerosolized hydrocarbon particle stream 112 and may naturally fall to the bottom of the aerosolizing unit 110 due to their weight. The larger droplets of the aerosolized hydrocarbon particle stream 112 may have a droplet size greater than 100 μm. The smaller droplets of the aerosolized hydrocarbon particle stream 112 may have a droplet size greater than 10 μm. The larger droplets of the aerosolized hydrocarbon particle stream 112 may be removed from the system or may be recycled to be aerosolized again.

Still referring to FIGS. 1 and 2, contacting the aerosolized hydrocarbon particle stream 112 with an aerosolized reaction catalyst 114 may increase conversion of the liquid hydrocarbon stream 102 to the lower boiling point hydrocarbons 132, such as the $C_2$—$C_4$ olefins. In embodiments, the higher boiling point hydrocarbons in the aerosolized hydrocarbon particle stream 112 may be $C_{5+}$ hydrocarbons. Referring to FIG. 1, in some embodiments, a reaction catalyst 104 may be aerosolized separately from the liquid hydrocarbon stream 102. The reaction catalyst 104 may be aerosolized using any of the methods as previously described with respect to the liquid hydrocarbon stream 102. With reference to FIG. 2, it is also contemplated that in some embodiments, prior to any aerosolizing, the liquid hydrocarbon stream 102 and the reaction catalyst 104 may be combined to form a liquid hydrocarbon stream and reaction catalyst slurry 212. The liquid hydrocarbon stream and reaction catalyst slurry 212 may then be aerosolized in the aerosolizing unit 110 to form a mixed aerosolized particle stream 214 (which may include the aerosolized hydrocarbon particle stream 112 and the aerosolized reaction catalyst 114 of FIG. 1). The mixed aerosolized particle stream 214 may be passed from the aerosolizing unit 110 to the hydrocarbon conversion unit 120.

Again referring to FIG. 1, in embodiments where the liquid hydrocarbon stream 102 and the reaction catalyst 104 are aerosolized separately, the aerosolized hydrocarbon particle stream 112 may be combined with the aerosolized reaction catalyst 114 downstream of the aerosolizing unit 110 using particle diffusion, electrophoretics, or any other suitable driving force to cause the aerosolized hydrocarbon particle stream 112 and the aerosolized reaction catalyst 114 and the aerosolized reaction catalyst 114 to collide, mix, and react and form a mixed aerosolized particle stream 214.

Again referring to FIG. 2, in embodiments where a liquid hydrocarbon stream and reaction catalyst slurry 212 is formed upstream of the aerosolizing unit 110 in the mixing unit 210, the liquid hydrocarbon stream and reaction catalyst slurry 212 may include the liquid hydrocarbon stream 102 and any suitable number of reaction catalysts 104. For example, the liquid hydrocarbon stream and reaction catalyst slurry 212 may include, in addition to the liquid hydrocarbon stream 102, one or more reaction catalysts 104.

Now referring to FIGS. 1 and 2, the reaction catalyst 104 may include a homogeneous catalyst or a heterogeneous catalyst. Additionally, the reaction catalyst 104 may include a microporous zeolite catalyst support material (that is, having an average pore size of less than 2 nm), a mesoporous zeolite catalyst support material (that is, having an average pore size from 2 nm to 50 nm), or a hierarchical zeolite catalyst support material. In embodiments, the zeolite catalyst support material may be ZSM-5, ZSM-12, ZSM-20, ultra-stable Y-type (USY), rare earth ultra-stable Y-type (RE-USY), NaY, SAPO-34, ITQ-7, ITQ-21, ITQ-33, or MCM-22. The reaction catalyst 104 may also include various metals such as, but not limited to, iron, nickel, molybdenum, cobalt, zinc, or combinations of these. In embodiments, the reaction catalyst 104 may include combinations of any of the previous, such as a homogeneous catalyst, a heterogeneous catalyst, a microporous zeolite catalyst support material, a mesoporous zeolite catalyst support material, and a hierarchical zeolite catalyst support material.

With reference to FIG. 1, in the hydrocarbon conversion unit 120, the aerosolized hydrocarbon particle stream 112 may be exposed to varying reaction conditions. These reaction conditions may include temperature, pressure, residence time, presence (or absence) of reactive gases, or combinations of these. For example, the aerosolized hydrocarbon particle stream 112 may be subjected to temperatures ranging from 25° C. to 1,000° C., pressures ranging from 0 bar to 15 bar, and residence times ranging from 0.5 seconds (s) to 10 minutes.

For example, the aerosolized hydrocarbon particle stream 112 may be subjected to temperatures ranging from 25° C. to 1,000° C., such as from 50° C. to 1,000° C., from 100° C. to 1,000° C., from 200° C. to 1,000° C., from 300° C. to 1,000° C., from 400° C. to 1,000° C., from 200° C. to 1,000° C., from 500° C. to 1,000° C., from 25° C. to 800° C., from 50° C. to 800° C., from 100° C. to 800° C., from 200° C. to 800° C., from 300° C. to 800° C., from 300° C. to 750° C., from 400° C. to 800° C., from 200° C. to 800° C., from 500° C. to 800° C., from 25° C. to 600° C., from 50° C. to 600° C., from 100° C. to 600° C., from 200° C. to 600° C., from 300° C. to 600° C., from 400° C. to 600° C., from 200° C. to 600° C., from 500° C. to 600° C., from 25° C. to 400° C., from 500° C. to 400° C., from 100° C. to 400° C., from 200° C. to 400° C., or from 300° C. to 400° C. The aerosolized hydrocarbon particle stream 112 may be subjected to temperatures ranging from 300° C. to 400° C., from 300° C. to 500° C., from 300° C. to 650° C., from 300° C. to 700° C., from 400° C. to 500° C., from 400° C. to 650° C., from 400° C. to 700° C. from 500° C. to 650° C., from 500° C. to 700° C., or from 600° C. to 700° C. It should be noted that temperatures greater than 1,000° C. are also contemplated.

The aerosolized hydrocarbon particle stream 112 may be subjected to pressures ranging from 0 bar to 15 bar, such as from 0 bar to 3 bar, from 0 bar to 4 bar, from 0 bar to 5 bar, from 0 bar to 6 bar, from 0 bar to 7 bar, from 0 bar to 8 bar, from 0 bar to 9 bar, from 0 bar to 11 bar, from 0 bar to 13 bar, from 1 bar to 2 bar, from 1 bar to 3 bar, from 1 bar to 4 bar, from 1 bar to 5 bar, from 1 bar to 6 bar, from 1 bar to 7 bar, from 1 bar to 8 bar, from 1 bar to 9 bar, from 1 bar to 10 bar, from 1 bar to 11 bar, from 1 bar to 13 bar, from 1 bar to 15 bar, from 3 bar to 4 bar, from 3 bar to 5 bar, from 3 bar to 6 bar, from 3 bar to 7 bar, from 3 bar to 8 bar, from 3 bar to 9 bar, from 3 bar to 10 bar, from 3 bar to 11 bar, from 3 bar to 13 bar, from 3 bar to 15 bar, from 5 bar to 6 bar, from 5 bar to 7 bar, from 5 bar to 8 bar, from 5 bar to 9 bar, from 5 bar to 10 bar, from 5 bar to 11 bar, from 5 bar to 13 bar, from 5 bar to 15 bar, from 7 bar to 8 bar, from 7 bar to 9 bar, from 7 bar to 10 bar, from 7 bar to 11 bar, from 7 bar to 13 bar, or from 7 bar to 15 bar. It should be noted that pressures greater than 15 bar are also contemplated.

The residence time of the aerosolized hydrocarbon particle stream 112 in the hydrocarbon conversion unit may range from 0.5 s to 10 min, such as from 1 s to 10 min, from 10 s to 10 min, from 20 s to 10 min, from 30 s to 10 min, from 40 s to 10 min, from 50 s to 10 min, from 1 min to 10 min, from 2 min to 10 min, from 3 min to 10 min, from 5 min to 10 min, from 7 min to 10 min, from 0.5 s to 8 min, such as from 1 s to 8 min, from 10 s to 8 min, from 20 s to 8 min, from 30 s to 8 min, from 40 s to 8 min, from 50 s to 8 min, from 1 min to 8 min, from 2 min to 8 min, from 3 min to 8 min, from 5 min to 8 min, from 7 min to 8 min, from 0.5 s to 5 min, such as from 1 s to 5 min, from 10 s to 5 min, from 20 s to 5 min, from 30 s to 5 min, from 40 s to 5 min, from 50 s to 5 min, from 1 min to 5 min, from 2 min to 5 min, from 3 min to 5 min, from 0.5 s to 3 min, such as from 1 s to 3 min, from 10 s to 3 min, from 20 s to 3 min, from 30 s to 3 min, from 40 s to 3 min, from 50 s to 3 min, from 1 min to 3 min, from 2 min to 3 min, from 0.5 s to 1 min, such as from 1 s to 1 min, from 10 s to 1 min, from 20 s to 1 min, from 30 s to 1 min, from 40 s to 1 min, or from 50 s to 1 min. It should be noted that residence times greater than 10 min are also contemplated.

Further, the aerosolized hydrocarbon particle stream 112 may be subjected to the presence of reactive gases such as, for example, oxygen, hydrogen, nitrogen, hydrogen peroxide, or combinations of these. Residence times of contact between the aerosolized hydrocarbon particle stream 112 and reactive gases may be any of the residence times specified above. The aerosolized hydrocarbon particle stream 112 may be subjected to the presence of reactive gases during the entire residence time in the hydrocarbon conversion unit 120 or may be subjected to the presence of reactive gases for less than the entire residence time in the hydrocarbon conversion unit 120.

By subjecting the aerosolized hydrocarbon particle stream 112 to various reaction conditions, chemistries within the individual hydrocarbon droplets of the aerosolized hydrocarbon particle stream 112 may become activated or deactivated. For example, by increasing the temperature, lower-boiling point components of individual hydrocarbon droplets of the aerosolized hydrocarbon particle stream 112 may change phases from an aerosol to a vapor. These lower-boiling point components may then be separated and collected from the aerosolized hydrocarbon particle stream 112. Additionally, as the present embodiments may be operated on a continuous basis, reaction conditions may be varied to allow for different chemistries within the individual hydrocarbon droplets of the aerosolized hydrocarbon particle stream 112 to be altered. By altering different chemistries within the individual hydrocarbon droplets of the aerosolized hydrocarbon particle stream 112, conversion may be tailored for a specific selectivity, conversion, or both, such as conversion to light olefins. With reference to FIG. 2, the liquid hydrocarbon stream and reaction catalyst slurry 212 may be exposed to varying reaction conditions in the hydrocarbon conversion unit 120 in the same manner that the aerosolized hydrocarbon particle stream 112, as previously discussed.

As detailed above, the temperature in the hydrocarbon conversion unit 120 may be varied to encourage separation of components from the aerosolized hydrocarbon particle stream 112. That is, the evaporation of components that have a lower boiling point than other components may allow gaseous products to be separated from the aerosolized hydrocarbon particle stream 112. More specifically, as the temperature of the aerosolized hydrocarbon particle stream 112 is increased in the hydrocarbon conversion unit 120, components having a boiling point below the temperature in the hydrocarbon conversion unit 120 may evaporate off the aerosolized hydrocarbon particle stream 112 and enter the gas phase. This may allow, for example, lower boiling point hydrocarbons such as light olefins, methane, propane, butane, ethane, or combinations thereof to enter the gas phase.

In embodiments, the aerosolized reaction catalyst 114 may have cracking capabilities. The aerosolized reaction catalyst 114 may aid in cracking reactions of the aerosolized hydrocarbon particle stream 112 to produce lower boiling point hydrocarbons 132. In embodiments where the aerosolized reaction catalyst 114 has cracking capabilities, it is contemplated that any conventional or yet to be developed cracking catalyst may be used. Additionally or alternatively, the aerosolized reaction catalyst 114 may have demetallization, desulfurization, or denitrogenation capabilities. More than one aerosolized reaction catalyst 114 may be used or a bi-functional aerosolized reaction catalyst 114 may be used. It is contemplated that any conventional or yet to be developed demetallization, desulfurization, or denitrogenation catalyst may be used.

In embodiments, once the lower boiling point hydrocarbons 132 are in a different phase than at least some other components, such as the higher boiling point hydrocarbons, the two may be separated in the separation unit 130. The separation unit 130 may be, for example, a coalescer, a cyclonic filter, a wet collector, a fibrous filter, or combinations of these. In embodiments, the separation of the lower boiling point hydrocarbons 132 from the aerosolized hydrocarbon particle stream or the higher boiling point hydrocarbons may also include any combination of the separation methods previously or hereinafter discussed. The separation unit 130 may operate at a temperature ranging from 50 degrees Celsius (° C.) to 500° C., pressures ranging from 1 bar to 15 bar, or residence times ranging from 0.05 seconds (s) to 2.0 s. However, it is contemplated that other operating conditions (e.g., temperature, pressure, and residence time) may be used depending on the size and configuration of the separation unit 130, such as for example, the size of tubes and flow rate limitations of the specific separation unit 130 chosen.

In embodiments, separating the lower boiling point hydrocarbons 132 from the aerosolized hydrocarbon particle stream 112 may include separating the lower boiling point hydrocarbons from higher boiling point hydrocarbons in the aerosolized hydrocarbon particle stream 112. The lower boiling point hydrocarbons (i.e., the material in the gas phase) may be separated from the higher boiling point hydrocarbons by impacting the aerosolized hydrocarbon particle stream 112. As used in this disclosure, "impacting" may refer to separating a gas phase from an aerosolized or liquid phase by passing both the gas phase and aerosolized phase through a network including fibers, impingement barriers, or both. The gas phase may follow a tortuous path around the network while the aerosolized or liquid phase may follow a straighter path and impact the network. As the aerosolized or liquid phase impact the network, the aerosolized or liquid phase may lose velocity and coalesce, eventually falling out of the network or remaining trapped in the network. In one non-limiting example, and in embodiments, the aerosolized hydrocarbon particle stream may pass through the network above. The lower boiling point hydrocarbons may follow the tortuous path around the network while the higher boiling point hydrocarbons follow the straighter path and impact the network. The higher boiling point hydrocarbons may then coalesce on the network. In embodiments, the network may include one or more fibrous filters, as discussed herein, set in a configuration to create the tortuous pathway for the aerosolized hydrocarbon particle stream.

In other embodiments, the lower boiling point hydrocarbons 132 (i.e., the material in the gas phase) may be separated from the higher boiling point hydrocarbons (i.e., the remaining aerosolized hydrocarbon particle stream 112) by passing the aerosolized hydrocarbon particle stream 112 through a filter, thereby filtering gaseous hydrocarbon particles from the aerosolized hydrocarbon particle stream 112. The gaseous hydrocarbon particles may include at least the lower boiling point hydrocarbons. In one non-limiting example, and in embodiments, the aerosolized hydrocarbon particle stream may be passed through the filter above. The filter may be configured to not allow at least a portion of the higher boiling point hydrocarbons of the aerosolized hydrocarbon particle stream 112 to pass through while allowing the lower boiling point hydrocarbons 132 to pass through. In embodiments, the filter may include one or more fibrous filters in sequence. The one or more fibrous filters may also be configured to have increasingly smaller sieve sizes in sequence, such that increasing amounts of the higher boiling point hydrocarbons are caught in the one or more fibrous filters as the aerosolized hydrocarbon particle stream 112 passes through the filter.

In still other embodiments, the lower boiling point hydrocarbons of the aerosolized hydrocarbon particle stream 112 may be heated to a gaseous form and may be separated from the higher boiling point hydrocarbons by coalescing the aerosolized hydrocarbon particle stream 112, such as by using the fibrous filters and heat generating materials discussed below.

In embodiments, the separation unit 130 may include the fibrous filter. The fibrous filter may include a fibrous material including glass, quartz-wool, stainless steel mesh, ceramic mesh, or sintered quartz. The fibrous material chosen for the fibrous filter may depend on the temperature of the fibrous filter, the hydrocarbon conversion unit, and the aerosolized hydrocarbon particle stream 112, as different fibrous materials may have different allowable temperatures. For example, quartz-wool may be used as the fibrous material for higher expected temperatures, for example up to 1300° C., whereas glass may be used for lower temperatures, owing to quartz-wool's higher temperature resistance and glass's lower temperature resistance. In embodiments, the fibrous material may have an individual particle size of between 4 µm to 15 µm, from 4 µm to 8 µm, or from 8 µm to 15 µm.

Figure 4:
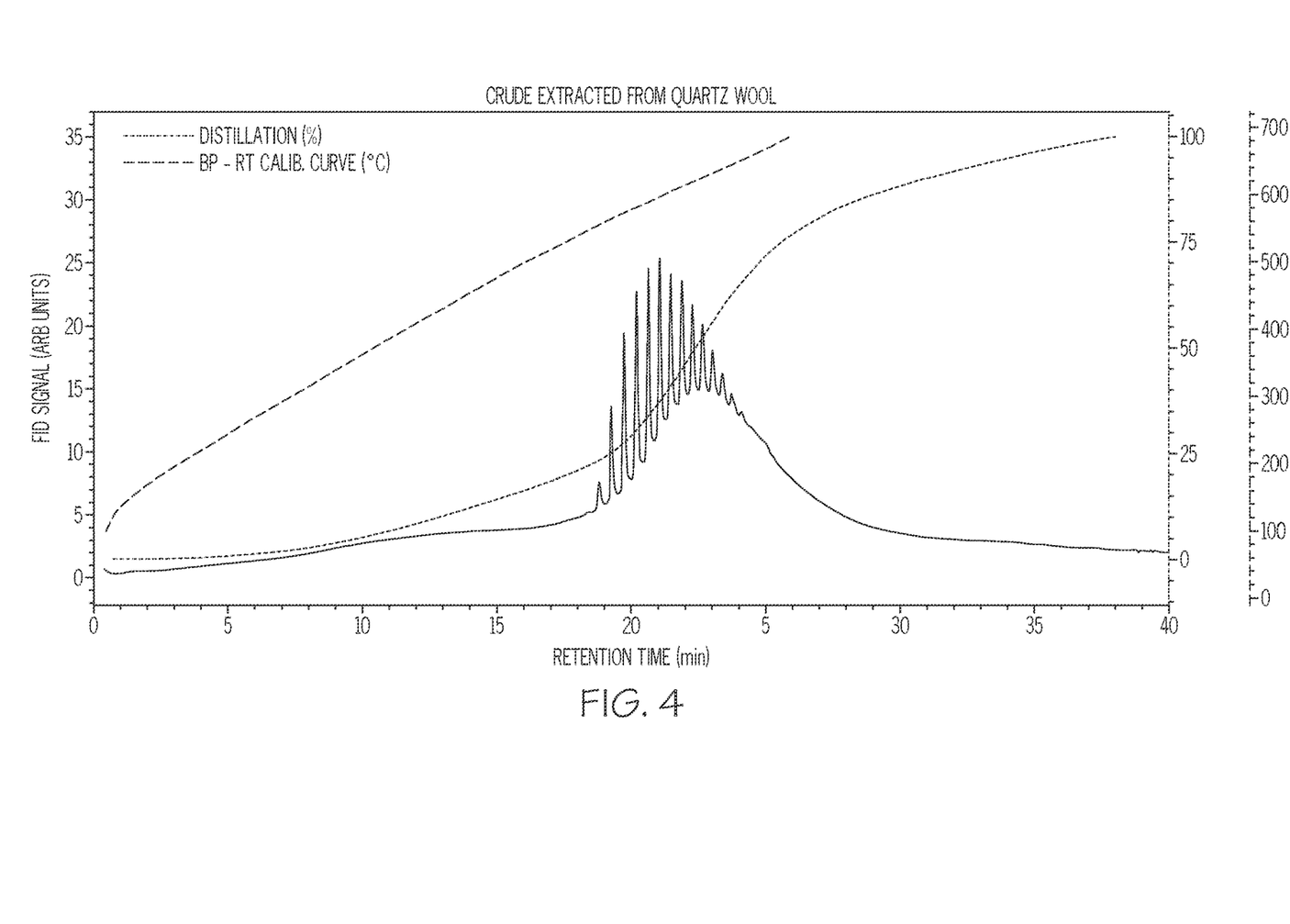
FIG. 4 graphically depicts an analysis of a hydrocarbon material that was extracted from a quartz-wool plug of a separation unit, according to one or more embodiments of the present disclosure.
Figure 5:
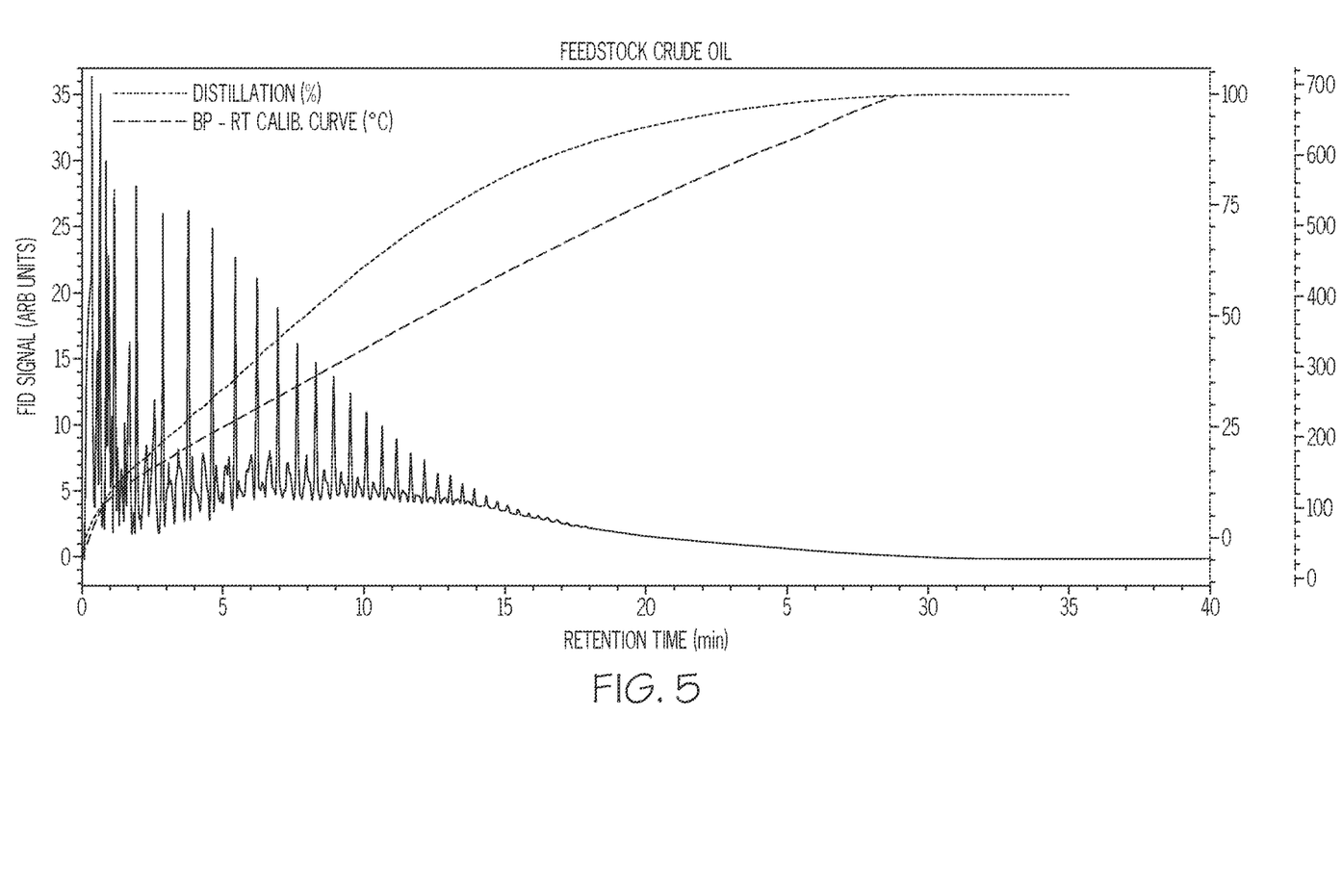
FIG. 5 graphically depicts an analysis of a liquid hydrocarbon stream prior to being aerosolized and entering the hydrocarbon conversion unit, according to one or more embodiments of the present disclosure.
Figure 6:
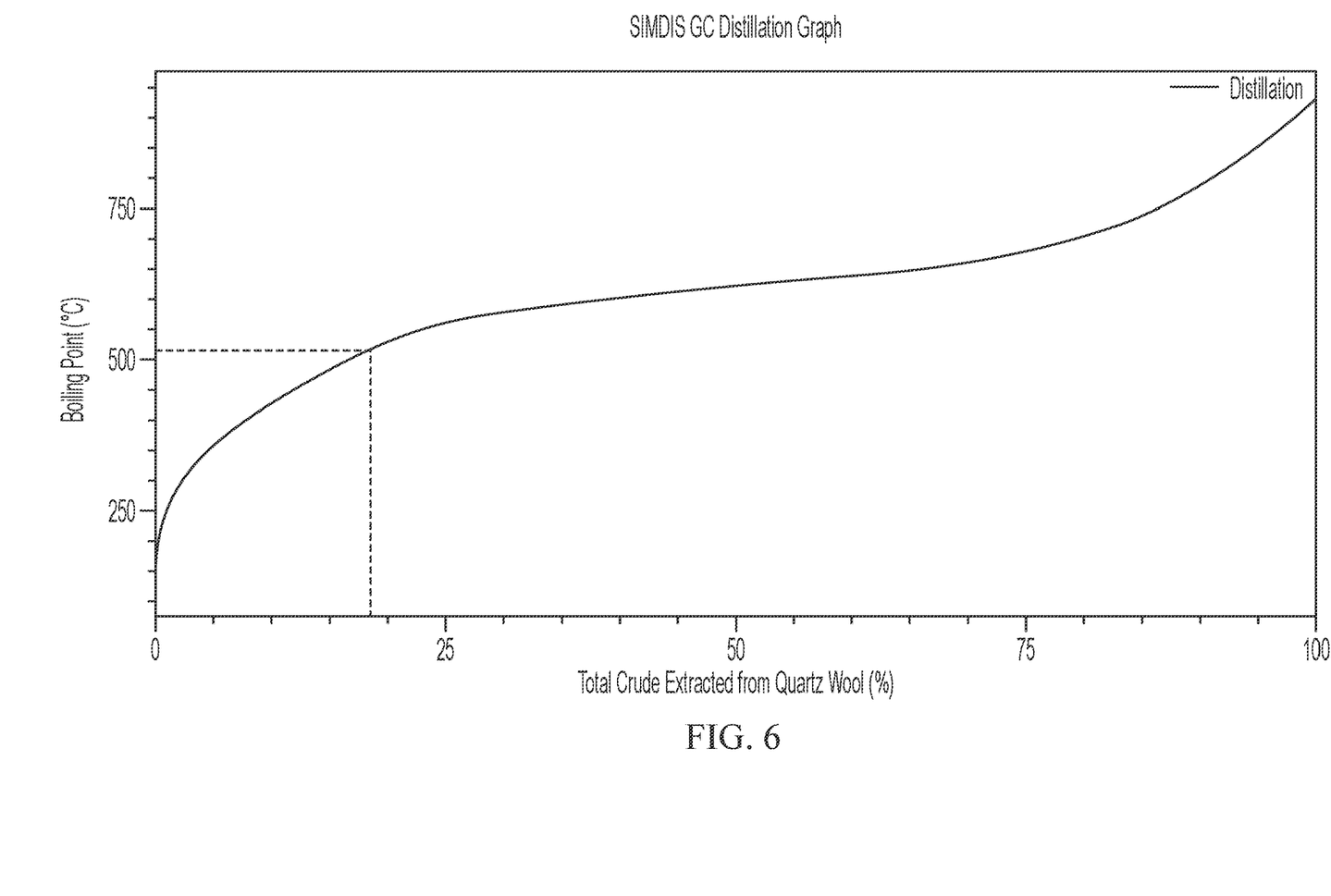
FIG. 6 graphically depicts a distillation component analysis of a liquid hydrocarbon stream that was extracted from a quartz-wool plug of a separation unit, according to one or more embodiments herein.

In embodiments, the fibrous filter may serve as a filter to capture higher boiling point hydrocarbons in the aerosolized hydrocarbon particle stream. For example, during application of the fibrous filter in an impacting process, the fibrous filter may coalesce or capture droplets of the higher boiling point hydrocarbons in the aerosolized hydrocarbon particle stream while allowing the lower boiling point hydrocarbons to pass through the fibrous filter. As illustrated in FIGS. 4 through 6, and as further explained in the Examples, the fibrous filters discussed in embodiments herein have shown unexpected effectiveness at catching primarily higher boiling point hydrocarbons within the fibrous filter, while allowing lower boiling point hydrocarbons such as light olefins to pass through.

In embodiments, and as shown in the Figures and Examples, passing the aerosolized hydrocarbon particle stream through the fibrous filter may capture or retain at least 80 wt. % higher boiling point hydrocarbons in the fibrous filter, measured by the total weight of all hydrocarbons captured or retained within the fibrous filter. The higher boiling point hydrocarbons may include hydrocarbons with boiling points of at least 500° C., such as from 500° C. to 1000° C., from 500° C. to 750° C., from 500° C. to 600° C., from 500° C. to 750° C., from 600° C. to 1000° C., from 600° C. to 750° C., or from 750° C. to 1000° C. The fibrous filter may also capture or retain at least 50 wt. % 600° C. to 1000° C. boiling point hydrocarbons. The fibrous filter may also capture or retain at least 25 wt. % 750° C. to 1000° C. boiling point hydrocarbons. When at least 'X' wt. % is used herein, it should be understood to encompass 'X' wt. % to 100 wt. %, as well as any smaller range within, such as for example "at least 80 wt. %" encompassing at least 80 wt. % to 90 wt. %, or at least 80 wt. % to 95 wt. %, and so on. As discussed herein, the preferential retention of higher boiling point hydrocarbons on the fibrous filters may allow targeted conversion of higher boiling point hydrocarbons into additional lower boiling point hydrocarbons to occur on the surface of the fibrous filter. Further, unconverted higher boiling point hydrocarbons may be recycled back in the system, allowing further exposure to reaction conditions in the aerosolized hydrocarbon stream 112 and complete conversion to the lower boiling point hydrocarbons 132.

In embodiments, the captured higher boiling point hydrocarbons may be recycled back into the system to produce additional lower boiling point hydrocarbons 132. For example, and in embodiments the captured higher boiling point hydrocarbons may be mixed with the liquid hydrocarbon stream 102 in the aerosolizing unit 110 or in the pre-mixing unit before being aerosolized again as the aerosolized hydrocarbon particle stream 112 to produce additional lower boiling point hydrocarbons 132.

In embodiments, the fibrous filter may further include a heat generating material. The heat generating material may include microwave absorbing materials, ferromagnetic materials, or both. The microwave absorbing materials may include silicon carbide, iron, carbon black, iron nanoparticles, nickel nanoparticles, or combinations thereof. The ferromagnetic materials may include silicon carbide, martensitic stainless steel, iron, nickel nanoparticles, or combinations thereof. In embodiments, the heat generating materials incorporated within the fibrous filters by chemical bonding, doping, vapor deposition, or combinations thereof. The chemical bonding may include covalent bonding, ionic bonding, or Van der Waal interactions, depending on the nature of the heat generating materials chosen. The heat generating materials may also be incorporated within the fibrous filter through a rod of the heat generating material being inserted within the fibrous filter, similar to how other reactors are heated electrically through induction.

In embodiments, when the fibrous filter is contacted with the higher boiling point hydrocarbons from the aerosolized hydrocarbon particle stream 112, the heat generating materials may be activated to contact the higher boiling point hydrocarbons with additional heat, thereby forming additional lower boiling point hydrocarbons. This process may be similar to a delayed coking, flash vaporization, and thermal cracking reactions.

Activating the heat generating material may include microwave heating or inductive current heating. Microwave heating may include contacting the microwave absorbing materials with microwaves through an external radiation source, thereby causing the microwave absorbing materials to absorb the radiation and experience a rapid increase in surface temperature. This surface temperature may then be transferred to the fibrous filter itself, and thereby the higher boiling hydrocarbons. Inductive heating may include inductively coupling the ferromagnetic materials to an applied oscillating electromagnetic field. Similar to inductive heating at the macroscale, (cooking surfaces, pipe bending) the inductive coupling causes the ferromagnetic materials to rapidly heat due to the conversion of the electromagnetic energy to heat via various mechanisms. In embodiments, electromagnetic frequencies between 100 to 500 kHz may cause the ferromagnetic materials, and thus the fibrous filter, to heat at rates greater than 20° C. per second. In embodiments, the heat generating materials, and thus the fibrous filters may also cool at a similar rate at which they heat when the external stimulus (electromagnetic energy or microwave radiation) is stopped. As mentioned previously, this rapid heating may cause the higher boiling point hydrocarbons to undergo delayed coking, flash vaporization, and thermal cracking reactions, generating additional lower boiling point hydrocarbons.

In other embodiments, the fibrous filter may further include catalytic fibers. That is, the fibrous filter may include a catalyst within or on the fibrous material. In embodiments, catalytic fibers may include any of the catalysts previously are hereinafter discussed, including materials such as zeolites, modified zeolites (e.g., mesoporous, core-shell, etc.), metal oxides, nanosand or silica, composite materials, or combinations of these. The catalyst materials of the catalytic fibers may be chemically adsorbed onto the fibrous material, i.e. individual fibers of the fibrous material, of the fibrous filter using electrostatic interactions so that they interact with any coalescing aerosol droplets or flowing gases. For example, polydiallyldimethylammonium chloride (PDAD-MAC) cationic polymer can be used in order to positively charge quartz-wool fibers. Then, desired amounts of the catalyst/HGM/composite materials (typically negatively charged) can be electrostatically adsorbed on the quartz-wool fibers. In embodiments, the fibrous filter, such as the quartz-wool filter, may be loaded with ultra-stable Y-type (USY) zeolites. In embodiments where the catalyst material comprises zeolites, nanoseed crystals may be electrostatically embedded on the fibrous material or individual fibers prior to subjecting the materials to crystallization conditions with additional zeolite reagents in order to generate fibrous material with a more fully covered shell of zeolite catalyst. The fiber surface area covered by embedded catalyst particles can range between 1% and 95%, such as from 5% to 95%, from 10% to 95%, from 25% to 95%, from 40% to 95%, from 60% to 95%, from 75% to 95%, from 5% to 75%, from 10% to 75%, from 25% to 75%, from 40% to 75%, or from 60% to 75%.

The catalytic fibers may transform the higher boiling point hydrocarbon captured on the fibrous filter into additional lower boiling point hydrocarbons 132, such as light olefins and BTX, through contact and catalytic reactions with the catalytic fibers. In embodiments, the reactions with the catalytic fibers may resemble fluid catalytic cracking reactions, wherein the higher boiling point hydrocarbons contact with the catalysts in the catalytic fibers may form additional lower boiling point hydrocarbons 132. In embodiments, reactive gases may also be introduced to the aerosolized hydrocarbon particle stream 112 after the aerosolized hydrocarbon particle stream is subjected to the reactor conditions but before contacting the fibrous filter. In embodiments, the presence of the reactive gases, such as hydrogen, in combination with the catalytic fibers may cause the higher boiling point hydrocarbons in the aerosolized hydrocarbon particle stream 112 to undergo additional catalytic cracking reactions, such as hydrocracking or hydrotreating. In these embodiments, the catalytic fibers may include catalysts traditionally known or used in hydrotreating or hydrocracking reactors, according to one with ordinary skill in the art.

In embodiments, the rapid heating and cooling of the fibrous filter may allow targeted reactions associated with contacting the fibrous filter. For example, upon observing the fibrous filter becoming covered or otherwise saturated with higher boiling point hydrocarbons, the heat generating materials may be activated and quickly brought to the desired reaction temperature. The reactions forming the additional lower boiling point hydrocarbons may then be allowed to continue until at such point in which the fibrous material is observed to no longer be saturated with higher boiling point hydrocarbons. The fibrous filter then may be allowed to rapidly cool, stopping the reactions. It is contemplated that these targeted reactions may have the further benefit of reducing the formation of petroleum coke byproducts produced by continued thermal cracking of the lower boiling point hydrocarbons.

In embodiments, the remaining aerosolized hydrocarbon particle stream 112 after treatment of the aerosolized hydrocarbon particle stream 112 in the hydrocarbon conversion unit 130 (i.e. the unconverted aerosolized stream or the higher boiling point hydrocarbons) may be converted to a solid, and the material in the gas phase may be separated from the material in the solid phase. In one non-limiting example, activation of the heat generating materials may cause the higher boiling point hydrocarbons to undergo a delayed coking reaction, thereby forming solid petroleum coke as a byproduct. As previously discussed, the material in the gas phase may be separated from the material in the solid phase by impacting or filtering out the material in the solid phase and cooling the material in the gaseous phase below a certain boiling point where the lower boiling point hydrocarbons 132 return to a liquid phase. Without intent to be bound to any particular theory, the ability to collect the higher boiling point hydrocarbons as material in the solid phase may greatly simply the separation of lower boiling point hydrocarbons 132 from the remaining aerosolized hydrocarbon particles stream 112 and or the higher boiling point hydrocarbons.

Figure 3:
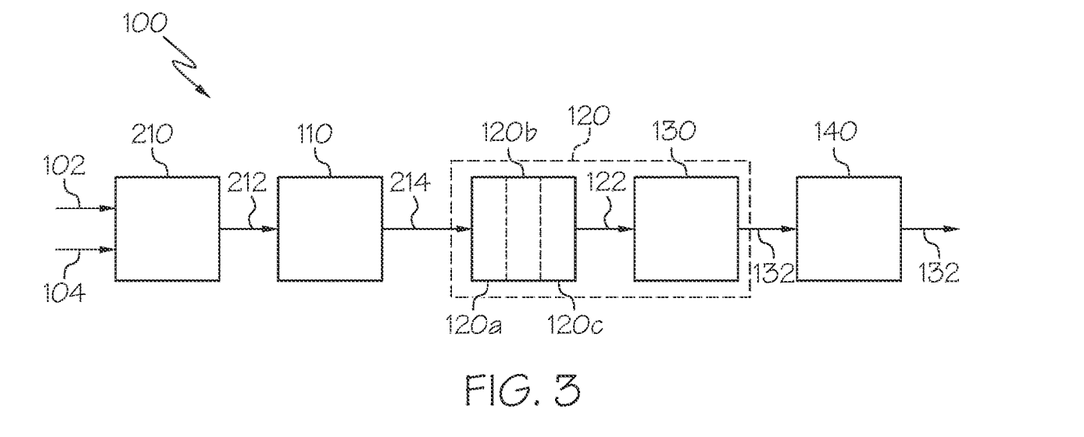
FIG. 3 schematically depicts yet another system for the conversion of a liquid hydrocarbon stream to lower boiling point hydrocarbons, according to one or more embodiments of the present disclosure.

Referring now to FIG. 3, in embodiments, the separation unit 130 may be disposed inside the hydrocarbon conversion unit 120. In other embodiments, the separation unit 130 may be disposed downstream of the hydrocarbon conversion unit 120 and may operate at reaction conditions similar or identical to the hydrocarbon conversion unit 120. In embodiments, the system 100 may further include a cold trap 140. The cold trap 140 may recollect fractions having a high enough vapor pressure to be partially converted to a gas phase. The cold trap 140 may be disposed downstream of the separation unit 130. The lower boiling point hydrocarbons 132 may be passed to the cold trap 140 such that the material in the vapor phase may be coalesced, condensed, and returned to the liquid phase. In embodiments, the cold trap 150 may condense or coalesce the lower boiling point hydrocarbons 132, to form liquid-phase lower boiling point hydrocarbons 132. However, in embodiments where the lower boiling point hydrocarbons 132 include methane, the methane may remain in vapor form within the cold trap 140. In embodiments, this may allow the methane to be separated from the lower boiling point hydrocarbons 132. This may also allow the separated methane to then be converted to hydrogen in a methane cracker, of which the hydrogen may then be used in the hydrocarbon conversion unit 120 if the hydrocarbon conversion unit 132 is configured to act like a hydrotreater or hydrocracker. The cold trap 140 may cool the lower boiling point hydrocarbons with, for example, a bath of dry ice and acetone.

In embodiments, and as previously mentioned, the liquid hydrocarbon stream 102 may be converted to the lower boiling point hydrocarbons 132. The lower boiling point hydrocarbons 132 may include at least $C_2$—$C_4$ olefins. The liquid hydrocarbon stream 102 may be converted to lower boiling point hydrocarbons 132 including at least 40 wt. % C2—C4 olefins, such as for example, 40 to 100 wt. % $C_2$—$C_4$ olefins. The lower boiling point hydrocarbons 132 may include from 35 wt. % to 100 wt. %, from 45 to 100 wt. %, from 55 to 100 wt. %, from 65 to 100 wt. %, from 85 to 100 wt. % $C_2$—$C_4$ olefins, or any narrower range within the previous, such as from to 55 wt. % $C_2$—$C_4$ olefins, from 45 to 85 wt. % $C_2$—$C_4$ olefins, etc. The liquid hydrocarbon stream 102 may also be converted to lower boiling point hydrocarbons 132 including at least BTX. The BTX may include benzene, toluene, ethylebenzene, mixed xylenes, or combinations thereof. The liquid hydrocarbon stream 102 may be converted to lower boiling point hydrocarbons 132 including at least 10 wt. % BTX, such as for example, 10 to 100 wt. % BTX. The lower boiling point hydrocarbons 132 may include from 5 wt. % to 60 wt. %, from 10 to 60 wt. %, from 15 to 60 wt. %, from 25 to 60 wt. %, from 40 to 60 wt. % BTX, or any narrower range within the previous, such as from 5 to 15 wt. % BTX, from 10 to 60 wt. % BTX, etc.

Further, and in embodiments, the liquid hydrocarbon stream 102 may be converted to lower boiling point hydrocarbons 132, such as $C_2$—$C_4$ olefins or BTX, with minimal formation of dry gas or coke. In embodiments, less than 25 wt. % of the lower boiling point hydrocarbons 132 may include dry gas, such as 0 wt. % to 25 wt. % dry gas, or such as less than 20 wt. % dry gas, less than 15 wt. % dry gas, 10 wt. % dry gas, or less than 5 wt. % dry gas. As used herein, "dry gas" refers to methane. In embodiments, less than 15 wt. % of coke may be produced, such as 0 wt. % to 15 wt. % coke, or such as less than 10 wt. % coke, less than 5 wt. % coke, less than 4 wt. % coke, less than 3 wt. % coke, less than 2 wt. % coke, or less than 1 wt. % coke. As used herein, "coke" may refer to petroleum coke, a solid crude oil byproduct normally disposed of.

EXAMPLES

The various embodiments of methods for converting a hydrocarbon stream to lower boiling point hydrocarbons will be further clarified by the following examples. The examples are illustrative in nature, and should not be understood to limit the subject matter of the present disclosure.

Example 1: Conversion Of An Aerosolized Hydrocarbon Stream To Lower Boiling Point Hydrocarbons An Arab Light crude oil, according to the composition in Table 1, was first desalted. The desalted, hydrotreated Arab Light crude oil was then stored in a glass one liter container with magnetic stirring to maintain homogeneity. A high-performance liquid chromatography (HPLC) pump then delivered a constant flow of the desalted, hydrotreated Arab Light crude oil (at 2 mL/min) to an aerosolizing unit. Nitrogen was used as a compressed gas at a rate of 5 L/min to atomize the desalted, hydrotreated Arab Light crude oil into an aerosolized hydrocarbon stream. The aerosolized hydrocarbon stream was then passed to a hydrocarbon conversion unit. The hydrocarbon conversion unit was operated at a temperature of 300° C., a pressure of 1 bar, and at a residence time of 1.7 s.

The hydrocarbon conversion unit included a fibrous filter, quartz-wool plug, as the separation unit. The quartz-wool used to form the quartz-wool plug was fine wool (4-8 μm diameter) obtained from G.M. Associates, Inc. The hydrocarbon conversion unit was fed with the aerosolized hydrocarbon stream for one hour. After one hour, the flow of the aerosolized hydrocarbon stream was stopped and the hydrocarbon conversion unit was allowed to cool down.

The quartz-wool plug was removed from the hydrocarbon conversion unit and washed with carbon disulfide to extract hydrocarbon material from the quartz-wool filter. The extracted hydrocarbon material was analyzed by Simulated Distillation Gas Chromatography (SIMDIS) to determine the boiling point distribution of the hydrocarbon material left behind in the quartz-wool plug. FIGS. 4 and 5 graphically depict the SIMDIS analysis of the desalted, hydrotreated Arab Light crude oil prior to being aerosolized and entering the hydrocarbon conversion unit (FIG. 5) and the hydrocarbon material that was extracted from the quartz-wool plug (FIG. 4). The hydrocarbon material extracted from the quartz-wool plug contained many products, with a majority of the products being asphaltenes and polyaromatic hydrocarbons (PAH).

As shown in FIGS. 4 through 6, despite the hydrocarbon conversion unit operating at 300° C., most of the hydrocarbon material that was extracted from the quartz-wool plug had a boiling point greater than 500° C., whereas most of the liquid hydrocarbon stream had a boiling point less than 300° C. For example, over 80 wt. % of the liquid hydrocarbon stream extracted from the quartz-wool plug were hydrocarbons with boiling points greater than 500° C. Further, increasing the time the aerosolized hydrocarbon stream was fed through the system from one hour to two hours did not result in any noticeable change of the distribution of hydrocarbon products captured within the quartz-wool plug.

Without being bound to any particular theory, it is believed that the preferential retention of the greater than 500° C. boiling point hydrocarbons is due to the loss of the more volatile components and that the material captured on the coalescer remains at 300° C. from the time of capture until the end of heating, leading to loss of material with a boiling point above 300° C. These results demonstrate the successful aerosolization, transport through the hydrocarbon conversion unit, and separation by the quartz-wool filter. The aerosolization of the liquid hydrocarbon stream may allow a portion of the more volatile, lower boiling point components to pass through the quartz-wool filter, while a portion of the less volatile, higher boiling point components are captured in the quartz-wool filter and separated from the lower boiling point components. It is believed that further modifications of the fibrous filter may allow the conversion of these captured higher boiling point hydrocarbons into lower boiling points hydrocarbons such as light olefins, as discussed in embodiments herein.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method of converting a liquid hydrocarbon stream to lower boiling point hydrocarbons, the method comprising:
   combining the liquid hydrocarbon stream with a reaction catalyst to form a slurry comprising the liquid hydrocarbon stream and the reaction catalyst;
   converting the slurry to an aerosolized hydrocarbon particle stream-aerosolized reaction catalyst mixture;
   subjecting the aerosolized hydrocarbon particle stream-aerosolized reaction catalyst mixture to a temperature from 250° C. to 1,000° C. and a pressure of from 1 bar to 15 bar to catalytically crack the aerosolized hydrocarbon particle stream, thereby forming lower boiling point hydrocarbons and higher boiling point hydrocarbons in the aerosolized hydrocarbon particle stream; and
   separating the lower boiling point hydrocarbons from the aerosolized hydrocarbon particle stream, where the lower boiling point hydrocarbons comprise at least $C_2$—$C_4$ olefins.

2. The method of claim 1, in which converting the slurry to the aerosolized hydrocarbon particle stream-aerosolized reaction catalyst mixture comprises:
   contacting the slurry with a compressed gas;
   introducing ultrasonic vibration to the slurry; or
   both.

3. The method of claim 2, in which contacting the slurry with the compressed gas further comprises:
   emitting the compressed gas through an outlet of a spray nozzle, thereby contacting the slurry with the compressed gas at the outlet of the spray nozzle;
   feeding the slurry and the compressed gas through separate inlet valves within the spray nozzle, thereby contacting the slurry with the compressed gas within the spray nozzle, and emitting the slurry and the compressed gas together through the outlet of the spray nozzle;
   emitting the compressed gas through an airbrush, thereby passing the compressed gas across a surface of the slurry; or combinations thereof.

4. The method of claim 1, in which the reaction catalyst is selected from the group consisting of a homogenous catalyst, a heterogeneous catalyst, microporous zeolite catalyst support materials, mesoporous zeolite catalyst support materials, or combinations thereof.

5. The method of claim 1, further comprising subjecting the aerosolized hydrocarbon particle stream-aerosolized reaction catalyst mixture to the presence of reactive gases, in which the reactive gases comprise oxygen, hydrogen, nitrogen, hydrogen peroxide, or combinations thereof.

6. The method of claim 1, in which the lower boiling point hydrocarbons further comprise BTX, dry gas, coke, or combinations thereof, the BTX comprising benzene, toluene, ethylbenzene, mixed xylenes, or combinations thereof.

7. The method of claim 6, in which the lower boiling point hydrocarbons comprise at least 40 wt. % of $C_2$—$C_4$ olefins, at least 10 wt. % of BTX less than 25 wt. % dry gas, less than 15 wt. % coke; or combinations thereof.

8. The method of claim 1, in which separating the lower boiling point hydrocarbons from the aerosolized hydrocarbon particle stream-aerosolized reaction catalyst mixture consists of one or more of:
impacting the aerosolized hydrocarbon particle stream-aerosolized reaction catalyst mixture;
filtering the aerosolized hydrocarbon particle stream-aerosolized reaction catalyst mixture by passing the aerosolized hydrocarbon particle stream-aerosolized reaction catalyst mixture through a filter; or
passing the aerosolized hydrocarbon particle stream-aerosolized reaction catalyst mixture through a fibrous filter, thereby coalescing the aerosolized hydrocarbon particle stream-aerosolized reaction catalyst mixture on the fibrous filter.

9. The method of claim 8, further comprising passing the lower boiling point hydrocarbons through a cold trap, thereby condensing the $C_2$—$C_4$ olefins into the liquid phase and separating methane, wherein the lower boiling point hydrocarbons further comprise methane.

10. The method of claim 8, in which
passing the aerosolized hydrocarbon particle stream-aerosolized reaction catalyst mixture through the fibrous filter captures or retains at least 80 wt. % higher boiling point hydrocarbons measured by the total weight of hydrocarbons captured or retained on the fibrous filter; and
the higher boiling point hydrocarbons comprise hydrocarbons with boiling points of at least 500° C.

11. The method of claim 8, in which the fibrous filter comprises a fibrous material selected from the group consisting of glass, quartz-wool, stainless steel mesh, ceramic mesh, or sintered quartz.

12. The method of claim 8, in which:
the fibrous filter further comprises fibrous material and catalytic fibers;
the catalytic fibers comprise catalysts on fibers of the fibrous material;
the catalysts are selected from the group consisting of a homogenous catalyst, a heterogeneous catalyst, microporous zeolite catalyst support materials, mesoporous zeolite catalyst support materials, or combinations thereof; and
the method further comprises contacting the catalytic fibers with the aerosolized hydrocarbon particle stream-aerosolized reaction catalyst mixture on the fibrous filter, thereby catalytically forming further lower boiling point hydrocarbons.

13. The method of claim 1, in which the liquid hydrocarbon stream is selected from one or more of crude oil, vacuum residue, tar sands, bitumen, vacuum gas oils, or combinations thereof.

14. The method of claim 1, in which the liquid hydrocarbon stream is a crude oil having an American Petroleum Institute (API) gravity of from 25 degrees to 50 degrees.

15. A system for converting a liquid hydrocarbon stream to lower boiling point hydrocarbons, the system comprising:
a mixing unit configured to combine the liquid hydrocarbon stream and a reaction catalyst to a form a slurry comprising the liquid hydrocarbon stream and the reaction catalyst;
an aerosolizing unit fluidly connected to the mixing unit and configured to convert the slurry to an aerosolized hydrocarbon particle stream-aerosolized reaction catalyst mixture;
a hydrocarbon conversion unit fluidly connected to the aerosolizing unit and configured to form lower boiling point hydrocarbons and higher boiling point hydrocarbons from the aerosolized hydrocarbon particle stream-aerosolized reaction catalyst mixture; and
a separation unit fluidly connected to the hydrocarbon conversion unit and configured to separate the lower boiling point hydrocarbons from at least the aerosolized hydrocarbon particle stream-aerosolized reaction catalyst mixture, wherein the lower boiling point hydrocarbons comprise at least $C_2$—$C_4$ olefins.

16. The system of claim 15, wherein
the separation unit further comprises a fibrous filter comprising fibrous material and catalytic fibers; and
the separation unit is further configured to contact the catalytic fibers with the aerosolized hydrocarbon particle stream-aerosolized reaction catalyst mixture to catalytically form further lower boiling point hydrocarbons.

17. A method of converting a liquid hydrocarbon stream to lower boiling point hydrocarbons, the method comprising:
converting the liquid hydrocarbon stream to an aerosolized hydrocarbon particle stream;
subjecting the aerosolized hydrocarbon particle stream to a temperature from 250° C. to 1,000° C. and a pressure of from 1 bar to 15 bar, thereby forming lower boiling point hydrocarbons and higher boiling point hydrocarbons in the aerosolized hydrocarbon particle stream, the lower boiling point hydrocarbons comprising $C_2$—$C_4$ olefins; and
separating the lower boiling point hydrocarbons from the aerosolized hydrocarbon particle stream, consisting of one or more of impacting the aerosolized hydrocarbon particle stream, filtering the aerosolized hydrocarbon particle stream by passing the aerosolized hydrocarbon stream through a filter, or passing the aerosolized hydrocarbon particle stream through a fibrous filter, thereby coalescing the aerosolized hydrocarbon stream on the fibrous filter.

18. The method of claim 17, wherein:
the fibrous filter further comprises fibrous material and catalytic fibers;
the fibrous material is selected from the group consisting of glass, quartz-wool, stainless steel mesh, ceramic mesh, or sintered quartz;
the catalytic fibers comprise catalysts on fibers of the fibrous material;
the catalysts are selected from the group consisting of homogenous catalysts, heterogeneous catalysts, microporous zeolite catalyst support materials, mesoporous zeolite catalyst support materials, or combinations thereof; and
the method further comprises contacting the catalytic fibers with the aerosolized hydrocarbon particle stream on the fibrous filter, thereby catalytically forming further lower boiling point hydrocarbons, passing the lower boiling point hydrocarbons through a cold trap, thereby condensing the $C_2$—$C_4$ olefins into the liquid phase and separating methane, wherein the lower boiling point hydrocarbons further comprise methane, or both.

19. A system for converting a liquid hydrocarbon stream to lower boiling point hydrocarbons, the system comprising:

an aerosolizing unit configured to convert the liquid hydrocarbon stream to an aerosolized hydrocarbon particle stream;

a hydrocarbon conversion unit fluidly connected to the aerosolizing unit and configured to form lower boiling point hydrocarbons and higher boiling point hydrocarbons from the aerosolized hydrocarbon particle stream; and a separation unit fluidly connected to the hydrocarbon conversion unit and configured to separate the lower boiling point hydrocarbons from at least the aerosolized hydrocarbon particle stream, wherein the lower boiling point hydrocarbons comprise at least $C_2$–$C_4$ olefins, and wherein:

the separation unit further comprises a fibrous filter; and the separation unit is further configured to contact the fibrous filter with the aerosolized hydrocarbon particle stream to separate the lower boiling point hydrocarbons from the aerosolized hydrocarbon particle stream.

20. The system of claim 19, wherein:

the fibrous filter comprising fibrous material and catalytic fibers; and the separation unit is further configured to contact the catalytic fibers of the fibrous filter with the aerosolized hydrocarbon particle stream to catalytically form further lower boiling point hydrocarbons.

* * * * *